(12) United States Patent
Shearn

(10) Patent No.: US 8,186,535 B2
(45) Date of Patent: May 29, 2012

(54) TANK ASSEMBLY

(75) Inventor: Kenneth Mathew Shearn, Maple Valley, WA (US)

(73) Assignee: PACCAR Inc, Bellevue, WA (US)

( * ) Notice: Subject to any disclaimer, the term of this patent is extended or adjusted under 35 U.S.C. 154(b) by 1021 days.

(21) Appl. No.: 11/955,075

(22) Filed: Dec. 12, 2007

(65) Prior Publication Data

US 2009/0152274 A1 Jun. 18, 2009

(51) Int. Cl.
B65D 88/12 (2006.01)
(52) U.S. Cl. ......... 220/564; 220/562; 220/506; 220/528
(58) Field of Classification Search .................. 220/562, 220/563, 564, 566, 528, 506
See application file for complete search history.

(56) References Cited

U.S. PATENT DOCUMENTS

| | | | | |
|---|---|---|---|---|
| 178,947 A * | 6/1876 | Parker | ............. | 220/501 |
| 223,162 A * | 12/1879 | Nuubson | ............. | 220/506 |
| 1,289,472 A | 12/1918 | King | | |
| 2,092,392 A * | 9/1937 | Hewitt | ............. | 220/564 |
| 2,250,250 A * | 7/1941 | Brooks | ............. | 220/565 |
| 2,794,569 A | 6/1957 | McCuen | | |
| 3,251,500 A * | 5/1966 | Archbold | ............. | 220/562 |
| 3,615,999 A * | 10/1971 | Basier et al. | ............. | 156/172 |
| 3,712,502 A * | 1/1973 | Basier et al. | ............. | 220/564 |
| 3,931,907 A | 1/1976 | Henle | | |
| 4,172,573 A * | 10/1979 | Moore et al. | ............. | 244/135 R |
| 4,300,700 A | 11/1981 | Chang | | |
| 4,466,356 A | 8/1984 | Messersmith | | |
| 4,511,105 A * | 4/1985 | Morrisey | ............. | 244/135 R |
| 4,817,855 A * | 4/1989 | Bunkoczy | ............. | 228/171 |
| 4,925,057 A * | 5/1990 | Childress et al. | ......... | 244/135 R |
| 5,119,959 A | 6/1992 | Bogdan | | |
| 5,165,603 A * | 11/1992 | Hahn | ............. | 239/55 |
| 5,209,348 A * | 5/1993 | Schafer, III | ............. | 206/222 |
| 5,303,843 A * | 4/1994 | Zink et al. | ............. | 220/563 |
| 5,564,587 A * | 10/1996 | Falk et al. | ............. | 220/501 |
| 5,628,420 A * | 5/1997 | Hendrikse | ............. | 220/4.04 |
| 5,638,980 A * | 6/1997 | Parks | ............. | 220/562 |
| 5,848,720 A * | 12/1998 | Logan | ............. | 220/563 |
| 5,865,923 A * | 2/1999 | Johnson | ............. | 156/172 |
| 6,412,650 B1 * | 7/2002 | Warner | ............. | 220/4.12 |
| 7,581,557 B2 * | 9/2009 | Lindblom et al. | ............. | 137/259 |
| 2008/0035649 A1 * | 2/2008 | Ohlsson et al. | ............. | 220/564 |

* cited by examiner

*Primary Examiner* — Anthony Stashick
*Assistant Examiner* — Christopher McKinley
(74) *Attorney, Agent, or Firm* — Christensen O'Connor Johnson Kindness PLLC

(57) ABSTRACT

A storage device for retaining fluids is provided. The storage device includes a first container for retaining a first fluid, wherein the first container has a first end and a second end. The storage device further includes a first end container for retaining a second fluid, wherein the first end container is generally annular in shape and is at least partially received within a portion of the first end of the first container.

15 Claims, 6 Drawing Sheets

TANK ASSEMBLY

BACKGROUND

Heavy-duty trucks require large capacity fuel tanks to hold a sufficient amount of fuel for hauling long distances. The large fuel tanks are often cylindrically shaped and are mountable to a portion of the truck, such as the truck frame rail. Many other components are also typically mated to the frame rail, such as air tanks, battery packs, etc. With new requirements for reducing vehicle emissions, additional equipment must be included on the frame rail to filter out certain materials from the vehicle exhaust. Thus, there is a need to either reduce the size of the components that have normally been mounted on the frame rail or otherwise package such components together to increase available frame rail space.

One solution is to use a rectangular-shaped fuel tank that is mateable with other components. However, cylindrically-shaped tanks are traditionally the dominant tank type in, among other countries, the United States. The cylindrically-shaped tanks, or "round" tanks, are considered to constitute an essential part of the overall appearance of the heavy-duty truck. Moreover, round tanks provide the advantage of having a minimal rest volume, i.e. the volume which cannot be suctioned from the tank by the fuel suction tube.

Thus, it is desired to provide a design for traditional truck components that minimizes the number of required components and maximizes available frame rail space.

SUMMARY

A storage device for retaining fluids is provided. The storage device includes a first container for retaining a first fluid, wherein the first container has a first end and a second end. The storage device further includes a first end container for retaining a second fluid, wherein the first end container is generally annular in shape and is at least partially received within a portion of the first end of the first container.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

The claimed embodiments of the present disclosure will now be described with reference to the drawings where like numerals correspond to like elements. Although exemplary embodiments of the present disclosure will be described hereinafter with reference to heavy duty trucks, it will be appreciated that aspects of the described embodiments have wide application, and may be suitable for other uses. Accordingly, the following descriptions and illustrations herein should be considered illustrative in nature, and thus, not limiting the scope of the present disclosure and the appended claims.

Figure 1:
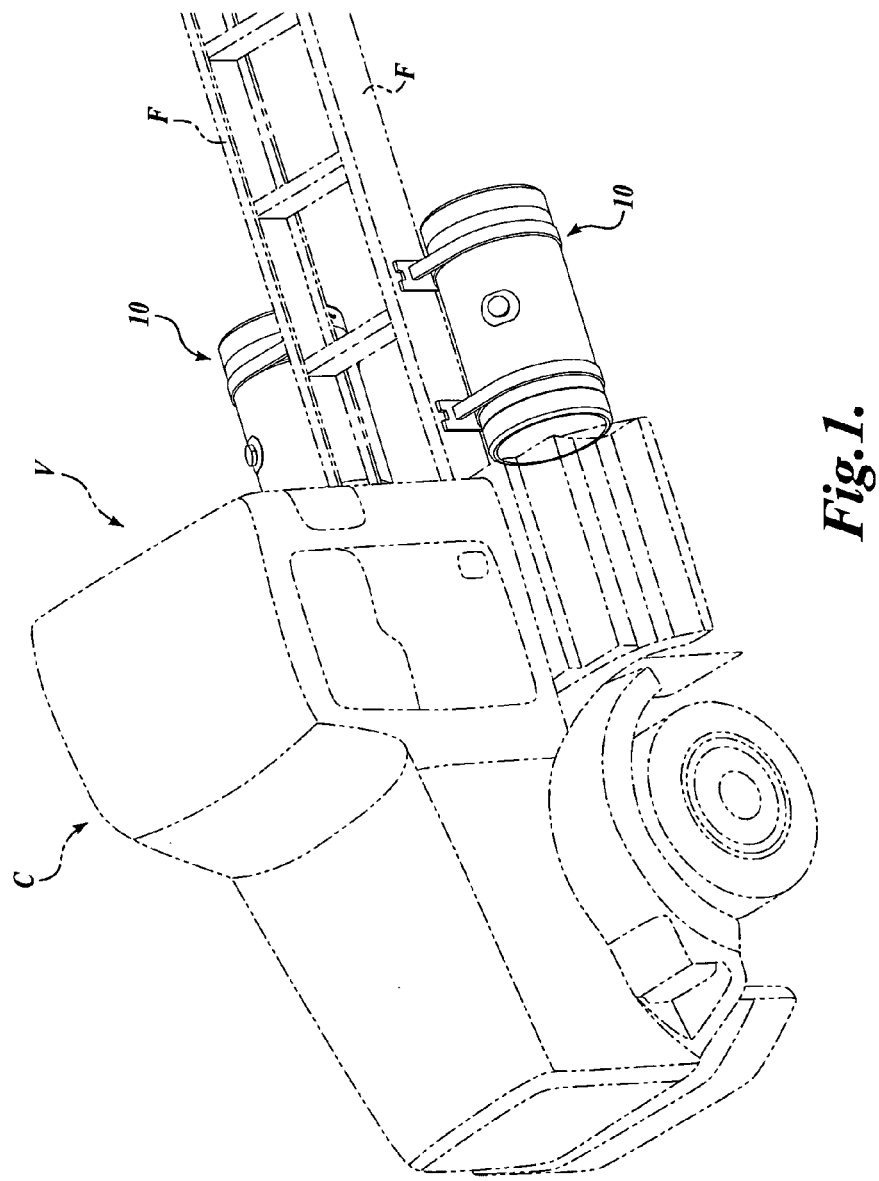
FIG. 1 is an environmental view of a representative embodiment of a tank assembly shown mounted to a vehicle frame rail.

A tank assembly 10 constructed in accordance with one embodiment of the present disclosure is best seen by referring to FIG. 1. FIG. 1 shows two tank assemblies 10, with each tank assembly 10 secured to a vehicle frame rail F of a vehicle V, such as a heavy duty truck. The vehicle V includes a cab C mounted to the frame rails F, and each tank assembly 10 is mounted to the frame rail F behind the cab C. It should be appreciated that the tank assembly 10 may be mounted to the vehicle V in other suitable locations, such as beneath the cab C. Moreover, more or less than two tank assemblies 10 may be used.

Figure 2:
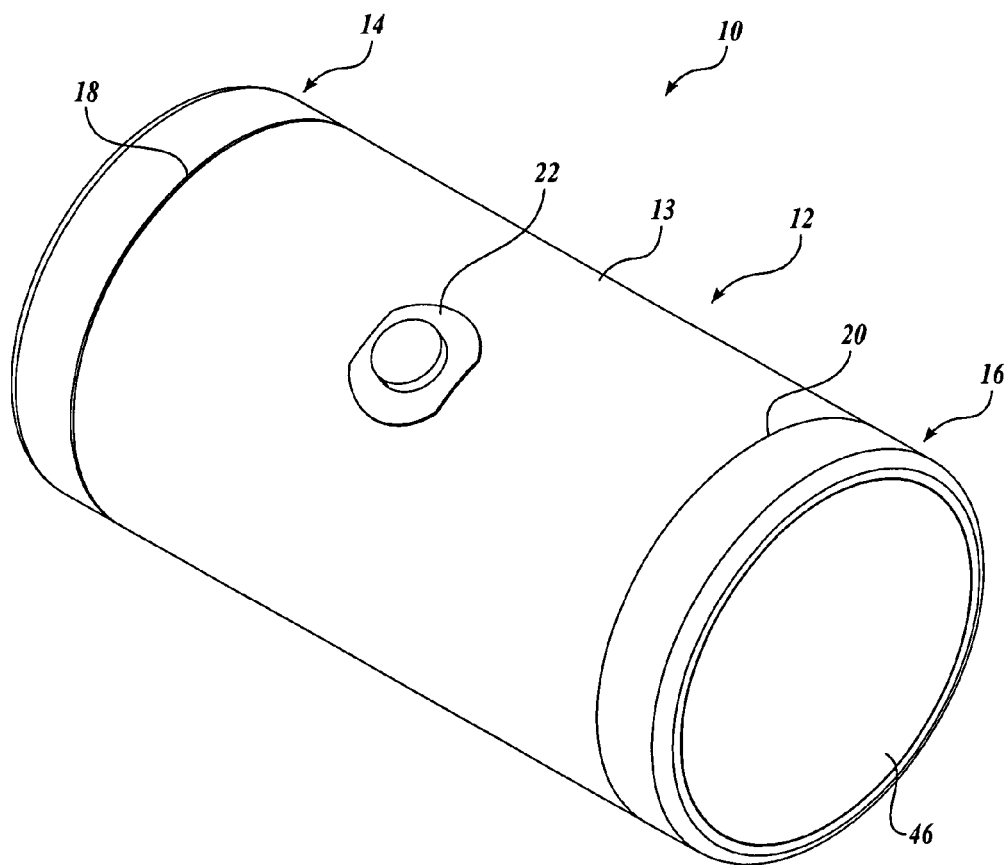
FIG. 2 is an isometric view of the tank assembly of FIG. 1.
Figure 3:
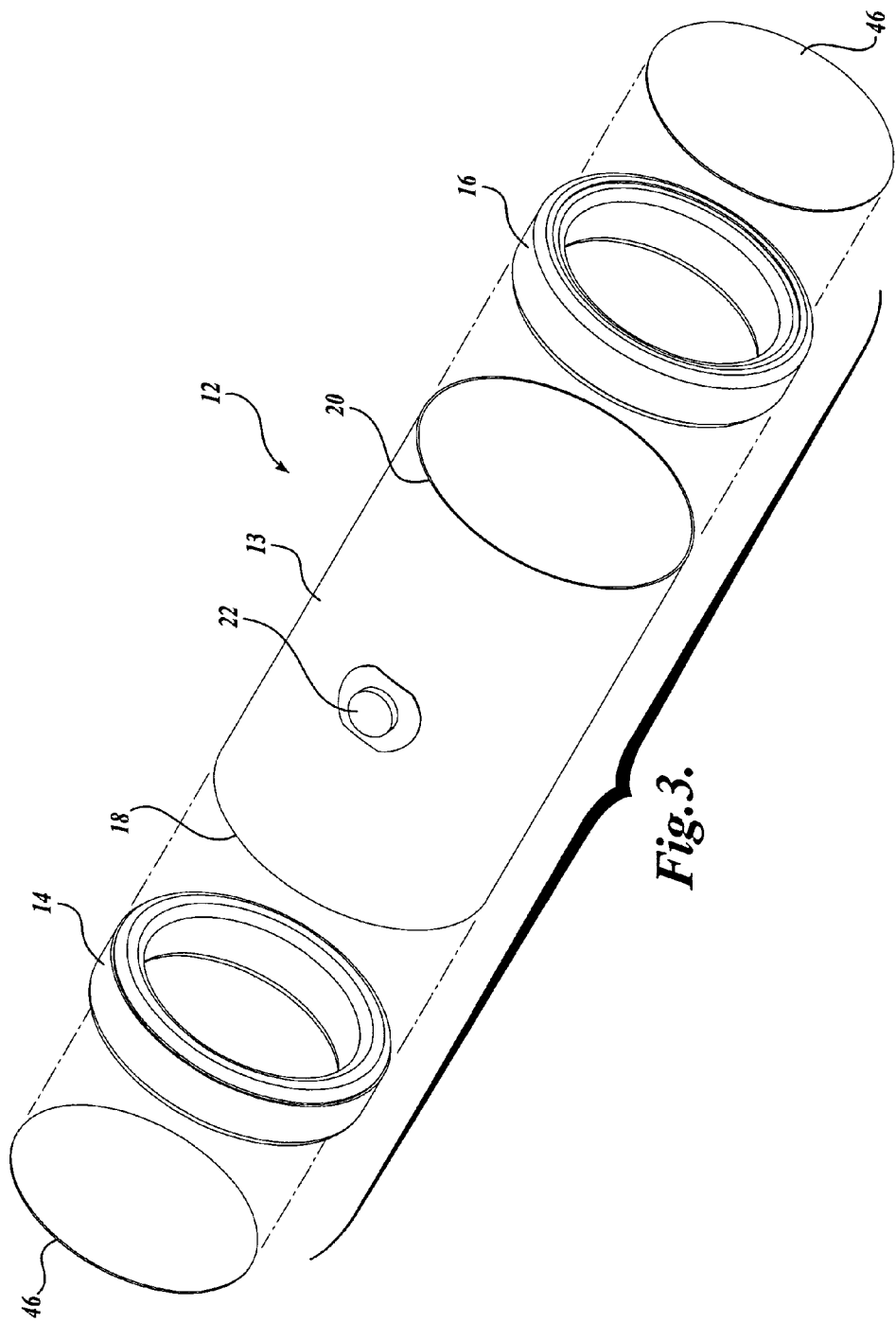
FIG. 3 is an exploded view of the tank assembly of FIG. 2.

Referring to FIGS. 2 and 3, the tank assembly 10 will now be described in more detail. The tank assembly 10 includes a first container, or first tank 12 that is defined by a cylindrical shell 13 having a first circular open end 18 and a second circular open end 20. The shell 13 may be constructed from any suitable material, such as steel, aluminum, etc. The first tank 12 includes an opening (not shown) sealed by a plug 22, wherein the opening defines an inlet/outlet port for transferring fluids between the first tank 12 and an external source. The first tank 12 may hold any suitable fluid, such as fuel.

The tank assembly 10 further includes first and second end containers, or first and second end tanks 14 and 16 secured within the first and second open ends 18 and 20 of the first tank 12, respectively. The first and second end tanks 14 and 16 are adapted to hold any suitable fluid, such as pressurized air. The first and second end tanks 14 and 16 are substantially identical; therefore, only the first end tank 14 will be hereinafter described in detail. Moreover, it should be appreciated that only one end tank may be used, with the other open end of the first tank 12 being closed off with any suitable structure.

The first end tank 14 is substantially cylindrical in shape and generally has the same outer diameter as the first tank 12. The first end tank 14 includes a center circular through-hole 15 (see FIG. 4) that is concentrically located within the first end tank 14 such that the first end tank 14 is substantially annular in shape. The interior volume of the first end tank 14 is defined by the size of the center through-hole 15 and the thickness of the tank 14. Preferably, the center through-hole 15 defines a tank volume of sufficient size to hold a suitable amount of pressurized air therewithin while minimizing the size and weight of the tank 14.

The first end tank 14 includes a plurality of inlet and outlet ports 32 that are adapted to be placed into communication with fluid lines for transferring fluids between the first end tank 14 and an external source. The ports 32 are adapted to provide connections for incoming pressurized air, outgoing pressurized air, and drainage of any condensed materials within the tank. The ports 32 may be integrally formed on the first end tank 14, or may instead be configured in a manifold that is formed on the first end tank 14 or secured to the first end tank 14 in a suitable manner.

Figure 4:
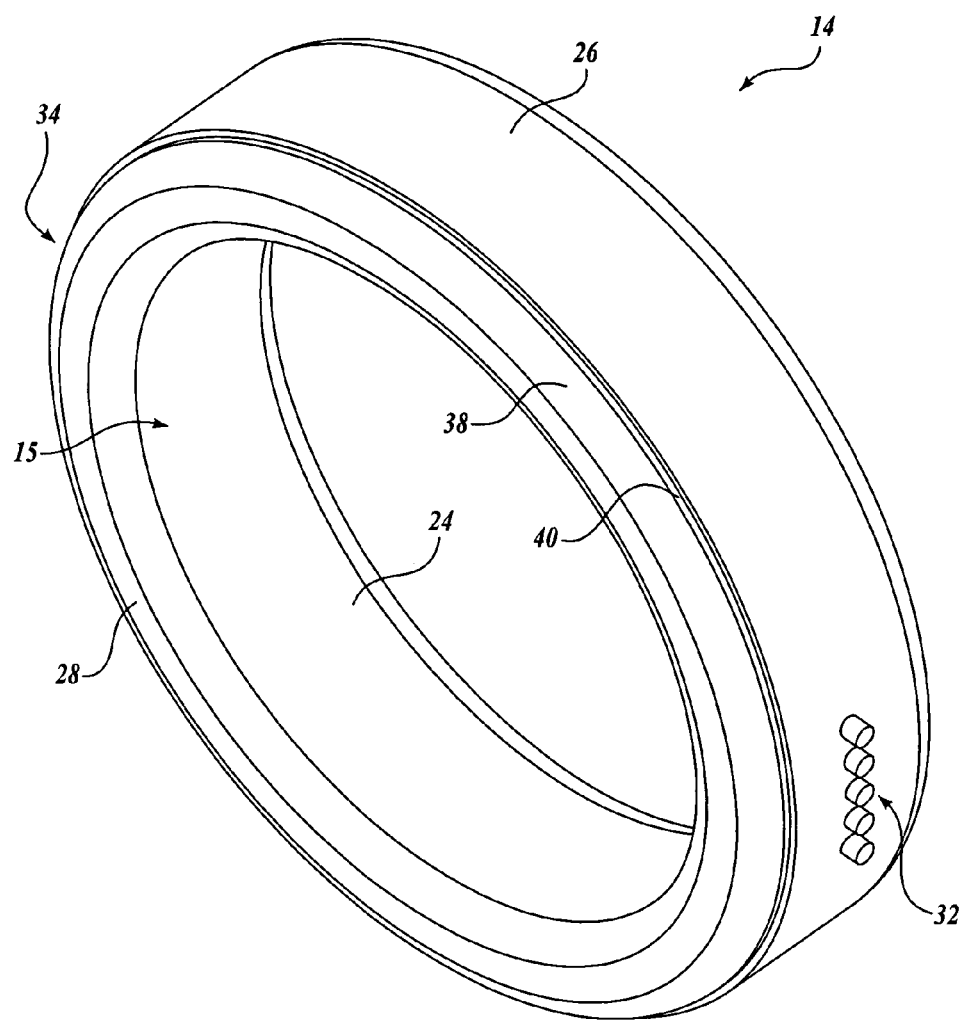
FIG. 4 is an isometric view of a first end tank of the tank assembly of FIG. 2 showing a first side of the first end tank.
Figure 5:
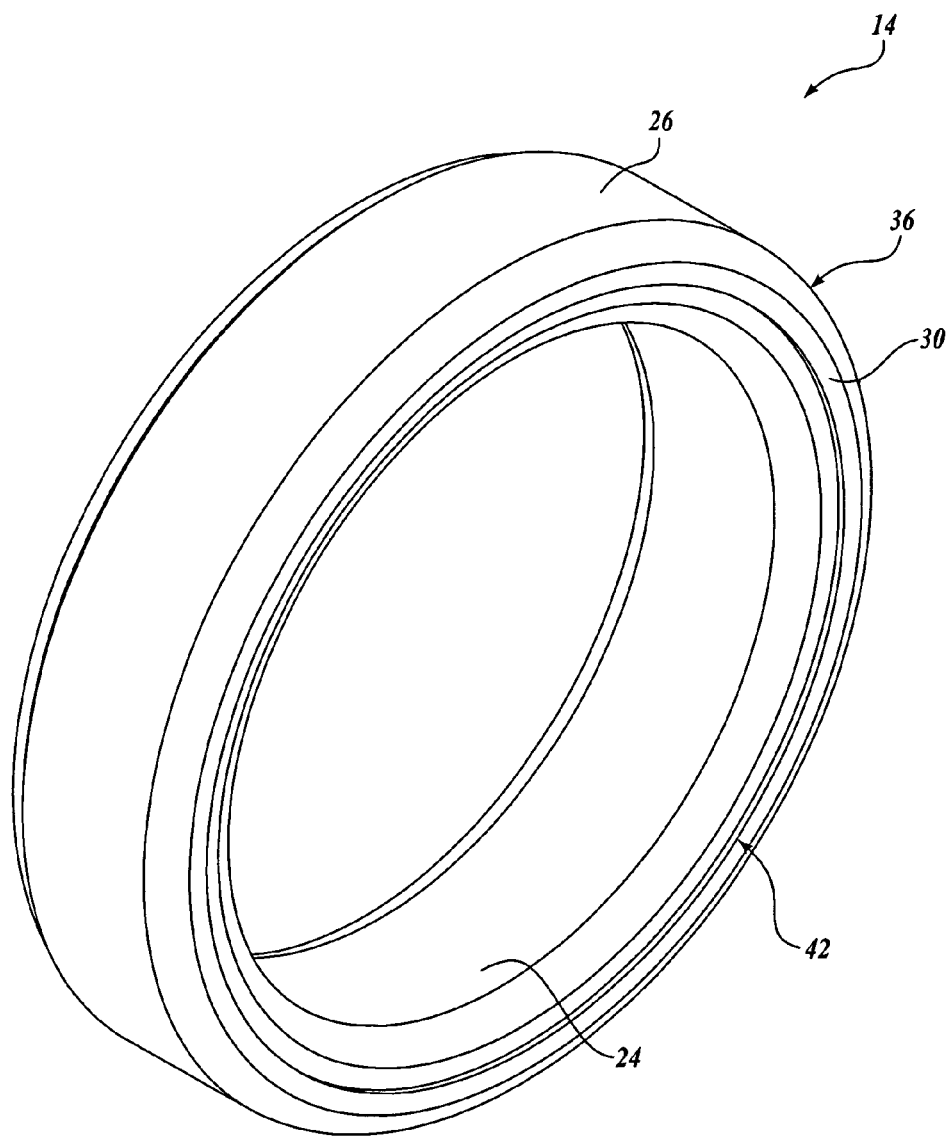
FIG. 5 is an isometric view of a first end tank of the tank assembly of FIG. 2 showing a first side of the first end tank.

Referring to FIGS. 4 and 5, the first end tank 14 includes an inner exterior surface 24 defined by the center through-hole 15, an outer exterior surface 26, an interior face 28, and an exterior face 30. The first end tank 14 further includes an annular tank-engaging portion 34 that is receivable within the first open end 18 of the first tank 12 and an annular exterior portion 36 that extends outwardly from the first open end 18 of the first tank 12.

Referring specifically to FIG. 4, the tank-engaging portion 34 is defined by a first annular recess 38 formed within the outer exterior surface 26 of the first end tank 14 adjacent to the interior face 28. The first annular recess 38 defines a tank-engaging shoulder 40 that is substantially transverse to the outer exterior surface 26. The tank-engaging portion 34 is slightly smaller in diameter than the interior diameter of the first tank 12 and is adapted to be slidably received within the first open end 18 of the first tank 12.

Figure 6:
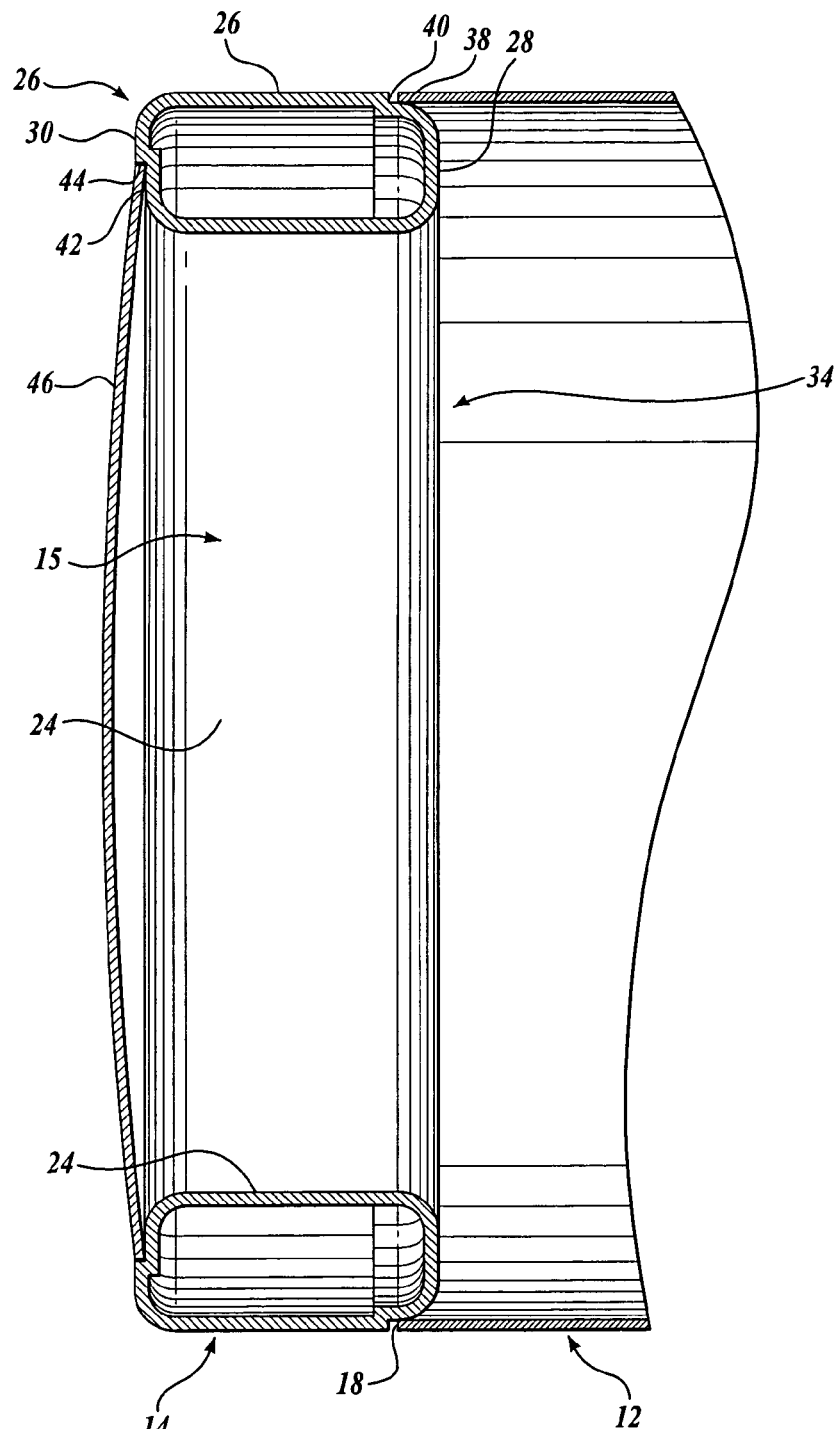
FIG. 6 is a cross-sectional view of the first end tank of FIGS. 4 and 5.

As can best be seen by referring to FIG. 6, the tank-engaging portion 34 is received within the first open end 18 of the first tank 12 until the edge of the first tank 12 engages the tank-engaging shoulder 30. The first end tank 14 may be thereafter welded to the first tank 12 to secure the tanks 12 and 14 together. Preferably, the outer diameter of the exterior portion 36 of the first end tank 14 is substantially equal to the outer diameter of the first tank 12. In this manner, the outer exterior surface 26 of the exterior portion 36 is substantially aligned with the outer surface of the first tank 12 to form a continuous tank assembly 10.

Referring to FIG. 5, the annular exterior portion 36 of the first end tank 14 includes a second annular recess 42 formed in the exterior face 30 of the first end tank 14 and substantially concentric with the center of the first end tank 14. The second annular recess 42 is adapted to receive an end cap 46 therewithin that encloses the interior of the first tank 12, as shown in FIG. 6. In the alternative, the first tank 12 may instead include an interior baffle (not shown) that encloses the interior of the first tank 12, and the end cap 46 may instead enclose a protective material, such as foam, between the end cap 46 and the baffle. The end cap 46 may be secured to the first end tank 14 in any suitable manner, such as by welding.

Combining the first and second end tanks 14 and 16 with the first tank 12 provides added storage while minimizing the space used on the vehicle frame rail F. This provides additional space for other vehicle components, such as the components necessary for reducing vehicle emissions. Moreover, positioning the first and second end tanks 14 and 16 on the ends of the first tank 12 provides added benefits. For example, it is easier to place at least one of the first and second end tanks 14 and 16 into fluid communication with certain areas of the vehicle V, such as the brakes, the trailer, etc. In addition, the first and second end tanks 14 and 16 serve as structural members that offer crush protection for the first tank 12. Moreover, combining the fuel and air tanks decreases the overall weight of the tanks since the air tanks serve the dual function of protecting the fuel tank.

While illustrative embodiments have been illustrated and described, it will be appreciated that various changes can be made therein without departing from the spirit and scope of the present disclosure.

The embodiments of the invention in which an exclusive property or privilege is claimed are defined as follows:

1. A storage device for retaining fluids, the storage device comprising:
    (a) a first container having an interior for retaining a first fluid, the first container having a first end and a second end;
    (b) a first end container for retaining a second fluid and isolating the second fluid from the first fluid, the first end container at least partially received within a portion of the first end of the first container, wherein the first end container is generally annular in shape to define an interior face disposed within the interior of the first container, an exterior face opposite the interior face, a through-hole extending between the interior face and the exterior face, an inner exterior surface defined by the through-hole and extending between the interior face and the exterior face, and an outer exterior surface opposite the inner exterior surface and extending between the interior face and the exterior face, and wherein the through-hole is in fluid communication with the interior of the first container; and
    (c) a second end container for retaining the second fluid, wherein the second end container is generally annular in shape and is at least partially received within a portion of the second end of the first container.

2. The storage device of claim 1, wherein the first container is suitable to retain a liquid and the first end container is suitable to retain a gas.

3. The storage device of claim 1, wherein the first end container includes a tank-engaging portion and an exterior portion, the exterior portion defined at least in part by the outer exterior surface and the exterior face.

4. The storage device of claim 3, wherein the tank-engaging portion of the first end container includes a first annular recess formed within the outer exterior surface for receiving the first end of the first container.

5. The storage device of claim 4, wherein the exterior portion of the first end container includes a second annular recess for receiving an end cap, wherein when the end cap is received within the second annular recess, the end cap encloses the through-hole of the first end container.

6. The storage device of claim 4, wherein a protective material is disposed between the end cap and the first end of the first container.

7. A storage device for retaining fluids, the storage device comprising:
    (a) a first container having an interior for retaining a liquid, the first container having a first end and a second end;
    (b) a first annular end container for retaining gas and isolating the gas from the liquid, the first annular end container at least partially received within a portion of the first end of the first container, wherein the first annular end container defines an interior face disposed within the interior of the first container, an exterior face opposite the interior face, a through-hole extending between the interior face and the exterior face, an inner exterior surface defined by the through-hole and extending between the interior face and the exterior face, and an outer exterior surface opposite the inner exterior surface and extending between the interior face and the exterior face, wherein the through-hole is in fluid communication with the interior of the first container; and
    (c) a second annular end container for retaining a gas, wherein the second annular end container is at least partially received within a portion of the second end of the first container.

8. The storage device of claim 7, wherein the first annular end container includes tank-engaging portion and an exterior portion, the exterior portion defined at least in part by the outer exterior surface and the exterior face.

9. The storage device of claim 8, wherein the tank-engaging portion of the first annular end container includes a first annular recess formed within the outer exterior surface for receiving the first end of the first container.

10. The storage device of claim 9, wherein the exterior portion of the first annular end container includes a second annular recess for receiving an end cap, wherein when the end cap is received within the second annular recess, the end cap encloses the through-hole of the first end container.

11. The storage device of claim 10, wherein the second annular end container includes a tank-engaging portion and an exterior portion.

12. The storage device of claim 11, wherein the tank-engaging portion of the second annular end container includes a first annular recess for receiving the second end of the first container.

13. The storage device of claim 12, wherein the exterior portion of the second annular end container includes a second annular recess for receiving an end cap, wherein when the end cap is received within the second annular recess, the end cap encloses a through-hole of the second end container.

14. A storage device for retaining fluids, the storage device comprising:
   (a) a first tank having an interior for retaining a liquid, the first tank having first and second ends and an interior;
   (b) a first end tank for retaining gas and isolating the gas from the liquid, the first end tank at least partially received within a portion of the first end of the first tank, the first end tank substantially annular in shape to define an interior face disposed within the interior of the first tank, an exterior face opposite the interior face, a through-hole extending between the interior face and the exterior face, an inner exterior surface defined by the through-hole and extending between the interior face and the exterior face, and an outer exterior surface opposite the inner exterior surface and extending between the interior face and the exterior face, wherein the through-hole is in fluid communication with the interior of the first tank;
   (c) an end cap received on an exterior portion of the first end tank, wherein when the end cap is received on the exterior portion of the first end tank, the end cap encloses the through-hole of the first end tank; and
   (d) a protective material disposed between the end cap and the first end of the first tank.

15. The storage device of claim 14, further comprising a second end tank for retaining a gas, the second end tank substantially annular in shape to define a through-hole, the second end tank at least partially received within a portion of the second end of the first tank such that the through-hole is in communication with the second end of the first tank.

* * * * *